(12) United States Patent  
Nehl

(10) Patent No.: US 6,837,658 B2
(45) Date of Patent: Jan. 4, 2005

(54) PLUG FOR FIXING TO HOLLOW AND TO SOLID BUILDING MATERIALS

(75) Inventor: Wolfgang Nehl, Waldachtal (DE)

(73) Assignee: fischerwerke Artur Fischer GmbH & Co. KG, Waldachtal (DE)

(*) Notice: Subject to any disclaimer, the term of this patent is extended or adjusted under 35 U.S.C. 154(b) by 231 days.

(21) Appl. No.: 10/179,067

(22) Filed: Jun. 26, 2002

(65) Prior Publication Data

US 2002/0176761 A1 Nov. 28, 2002

Related U.S. Application Data

(63) Continuation-in-part of application No. 10/069,449, filed on Oct. 25, 2001, now Pat. No. 6,558,094.

(30) Foreign Application Priority Data

Mar. 30, 2000 (DE) .......................................... 100 15 902
Jul. 12, 2001 (EP) ............................................. 01116963

(51) Int. Cl.$^7$ ................................................. F16B 13/04

(52) U.S. Cl. .......................... 411/36; 411/42; 411/80.1

(58) Field of Search ............................... 411/36, 37, 38, 411/42, 59, 80.1, 80.2

(56) References Cited

U.S. PATENT DOCUMENTS

| 3,942,407 A | * | 3/1976 | Mortensen | 411/36 |
| 4,861,206 A |   | 8/1989 | Riedel |  |
| 6,164,884 A | * | 12/2000 | Mayr | 411/36 |
| 6,558,094 B2 | * | 5/2003 | Nehl | 411/36 |

FOREIGN PATENT DOCUMENTS

| DE | 29 47 752 A1 | 7/1981 |
| DE | 196 00 931 A1 | 7/1997 |
| DE | 198 55 139 A1 | 5/2000 |

* cited by examiner

Primary Examiner—Neill Wilson
(74) Attorney, Agent, or Firm—Michael J. Striker

(57) ABSTRACT

A plug for fixing to hollow and to solid building materials has a plug body having a plurality of longitudinally extending expansible limbs that are expansible by screwing in of an expansion screw, the expansible limbs having a rear end and a leading end, a sleeve-shaped plug end which joins the expansible limbs with one another at the rear end and is formed so that the expansion screw is insertable through the plug end, a sleeve-shaped plug tip which joins the expansible sleeves with one another at the leading end and which is formed so that the expansion screw is screwable into the plug tip, and a stretchable material which joins the expansible limbs with one another circumferentially and which is pierced by several helically arranged slots.

9 Claims, 3 Drawing Sheets

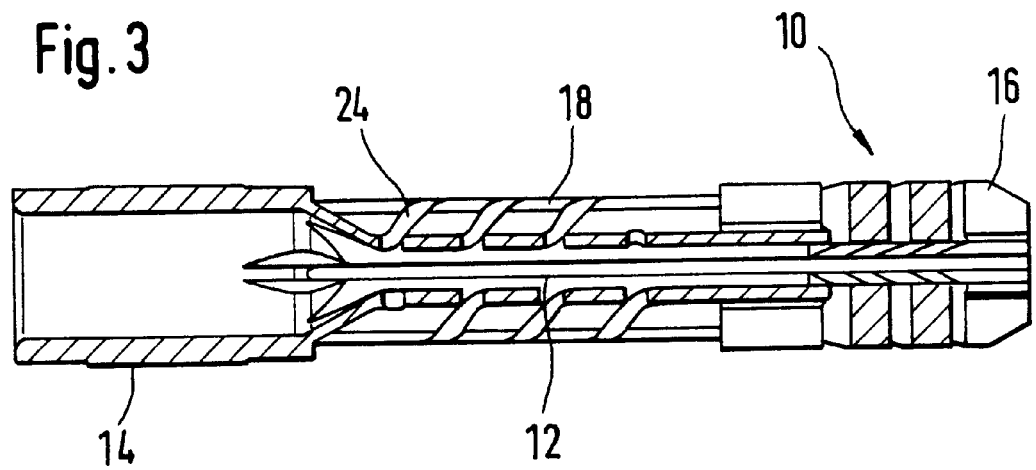
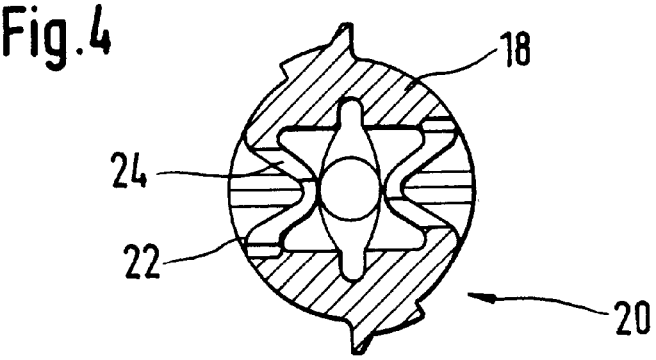
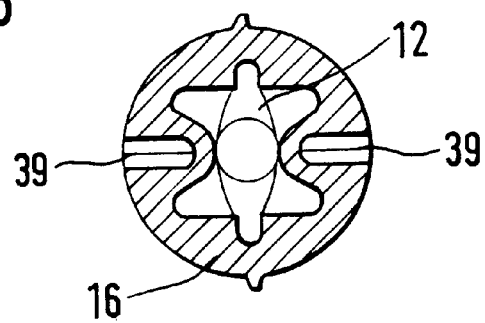

PLUG FOR FIXING TO HOLLOW AND TO SOLID BUILDING MATERIALS

CROSS-REFERENCE TO A RELATED APPLICATION

This application is a continuation-in-part of U.S. patent application Ser. No. 10/069,449 filed on Oct. 25, 2001, now U.S. Pat. No. 6,558,094.

BACKGROUND OF THE INVENTION

The present invention relates to a plug for fixing to hollow and to solid building materials. Hollow building materials shall mean, for example, hollow block bricks or panels behind which there is a cavity. Solid building materials shall mean, for example, concrete or similar structures.

Such plugs are known per se they are normally made of plastic material and in a middle region have longitudinally extending expansible limbs that are separated from one another by slots. The expansible limbs are joined to one another at the rear end by a sleeve-form plug end and at the leading end by a sleeve-form plug tip. An expansion screw can be pushed through the sleeve-form plug end and screwed into the plug tip. To fix the plug in a solid building material, the plug is inserted in a hole drilled in the solid building material and an expansion screw is screwed into the plug. The expansion screw presses the expansible limbs apart, that is, the expansion screw expands the expansible limbs, and consequently anchors the plug in the hole drilled in the solid building material.

In a hollow building material or in a panel, the plug is pushed through a drilled hole so that its sleeve-form plug end is located in the hollow building material. An expansion screw is then pushed through the plug end, guided between the expansible limbs and screwed into the plug tip. Screwing the expansion screw into the plug tip causes the plug tip to move towards the plug end, in so doing expanding the expansible limbs. There are actually two known expansion methods. In the first, the expansible limbs buckle outwards as the plug tip moves closer to the plug end and hence form an interlocking engagement with the hollow building material. The other possible method is that the plug tip twists in relation to the plug end as the expansion screw is screwed in, whereby the expansible limbs are wound round each other and form a knot-like structure that interlocks with the hollow building material.

The disadvantage of the known plugs is that the screw is poorly guided and, as it is screwed in, the expansion screw is able to emerge laterally through the slots between the expansible limbs. A further drawback of the known plugs is their low torsional stiffness, which leads to a resilient twisting of the plug tip in relation to the plug end as the expansion screw is screwed in. When screwing in the expansion screw by hand, the resilient twisting of the plug tip in relation to the plug end causes the plug tip, together with the expansion screw is screwed in. When screwing in the expansion screw by hand, the resilient twisting of the plug tip in relation to the plug end causes the plug tip, together with the expansion screw screwed therein, to turn back again when the user lets go of the screwdriver to re-adjust his grip. This has the result that the expansion screw can be screwed into the plug only poorly by hand.

SUMMARY OF THE INVENTION

Accordingly, it is an object of the present invention to provide a plug for fixing to hollow and to solid building materials, which avoids the disadvantages of the prior art.

In keeping with these objects and with others which will become apparent hereinafter, one feature of the present invention resides, briefly stated, in a plug in which expansible limbs are connected to one another circumferentially by a stretchable material that is pierced through by several helically arranged slots.

To render it stretchable, the material can be of thin construction and/or be undulated in the circumferential direction of the plug. In the case of a plug manufactured from plastics material, the stretchable material is preferably integral with the expansible limbs and hence consists of the same plastics material as the remainder of the plug. The stretchable material is in that case preferably of thin construction in the form of a plastic web.

The connection of the expansible limbs circumferentially gives the plug according to the invention the form of a sleeve, which is also closed circumferentially in the region of the expansible limbs. Good guidance of the expansion screw is consequently achieved and the expansion screw, even when subjected to a transverse stress is prevented from emerging laterally from the plug between the expansion limbs.

A further advantage of the connection of the expansible limbs in the circumferential direction is increased torsional stiffness. The increased torsional stiffness has first of all the advantage that the plug tip turns less with the expansion screw as this is screwed in, with the result that the expansion can be screwed better into the plug tip. Furthermore, the increased torsional stiffness has the advantage that the plug tip does not turn back so much when the insertion torque eases, that is, for example, when re-adjusting one's grip on the screwdriver. The expansion screw is therefore easier to screw into the plug, especially when screwing in by hand.

In addition, the plug according to the invention has the advantage that there is less falling off torque after the start of expansion in a hollow building material when screwing in the expansion screw. In the case of the known expansible plugs, the torque diminishes sharply when the expansible limbs have started to buckle outwards or coil around each other when fixing the plug to a hollow building material. This effect is at least reduced by virtue of the increased torsional stiffness of the plug according to the invention, as a consequence of the connection of its expansible limbs circumferentially. The effect of the sharp drop in torque when screwing in the expansion screw is a disadvantage, because the impression is given that the expansion screw or the plug has torn out because of overloading and does not therefore have a firm seating in the hollow building material.

The helically arranged slots in the stretchable material have only a negligible adverse effect on the torsional stiffness, yet promote the formation of an enlargement at the rear side of a hollow building material or a panel such that both limbs bear virtually completely, and with a large bearing surface around the drilled hole, against the rear side of the hollow building material or the panel. In particular in the end phase of the enlargement formation, the slots prevent an uncontrolled tearing of the stretchable material, which in the worst case can lead to complete tearing through of the connection between the two expansible limbs, and possibly to tearing of the plug tip.

In accordance with a further embodiment of the invention, the sleeve-form plug end has a larger diameter than the remaining part of the plug. The purpose of this construction is to achieve good seating of the plug in a hollow or panel-form building material, in which the plug is received essentially only with its sleeve-form plug end in a drilled hole and the remaining part of the plug is located in a cavity.

In accordance with a further embodiment of the invention, on its outer circumference the plug has at least two opposing, longitudinally extending anti-rotation ribs, which are of saw-tooth construction over a part of their length. The anti-rotation ribs absorb the torsional moment occurring as the expansion screw is screwed in and thus prevent co-rotation of the plug. The saw-tooth form construction of the anti-rotation ribs over a part of their length, especially in the region of the expansible limbs, provides discontinuities, which on the one hand, by forming scraper edges, enable the plug to be driven easily into the drilled hole, and on the other hand do not impair the ability of the expansible limbs to twist in order to form the enlargement.

In accordance with a further embodiment of the invention, the sleeve-form plug tip is provided with non-rectilinear, for example, V-shaped, slots, an angle (apex) or peak of the slot preferably pointing towards the leading or to the rear end of the plug. Because of their non-rectilinear formation, the slots have one arm with an inclination in the direction of the lead of the thread of the expansion screw and another arm of opposite inclination. The inclination of the slots in the plug tip can differ from the lead of the thread of the expansion screw, only their direction is the same or opposite. The arms of the non-rectilinear slots, the inclination of which runs in the direction of the lead of the thread of the expansion screw, serve for engagement of the thread turns of the expansion screw, they produce a good adaptation to different screw diameters. The non-rectilinear slots brig about a reliable engagement of expansion screws of small diameter, without the expansion screw tearing out of the plug tip as the expansion screw is tightened. At the same time, the non-rectilinear slots prevent a large increase in torque as an expansion screw of large screw diameter is screwed in.

The arms of the non-rectilinear slots, the inclination of which is directed opposite to the lead of the thread of the expansion screw, cause the plug tip to be axially stretchable, whereby the axial spacing of non-rectilinear slots arranged axially one behind the other on the plug tip changes. Adaptation to different leads of the screw thread of the expansion screw is consequently achieved.

In accordance with a further embodiment of the invention, the plug has a screw channel for the expansion screw, which channel inside the sleeve-form plug tip has a cross-section other than circular. In different directions the screw channel therefore has different transverse dimensions inside the plug tip. This feature also assists adaptation of the plug to different diameters of expansion screw. In a development thereof, the screw channel, inside the plug tip, comprises a flat, for example, slot-shaped, screw channel. The screw channel inside the plug tip can alternatively be in the form of two intersecting slots.

Finally, the plug tip can have two opposing, axially running slots, the base of which slots run spaced from the screw channel. This construction produces a further reduction in insertion torque as the expansion screw is screwed into the plug tip, since the slots improve the stretchability of the plug tip.

The invention is explained in detail below with reference to an exemplary embodiment illustrated in the drawings.

BRIEF DESCRIPTION OF THE DRAWINGS

FIG. 3 shows the plug of FIG. 1 according to the invention, in the axial section A—A;

FIGS. 4 and 5 show cross-sections of the plug, taken along the lines I—I and II—II.

DESCRIPTION OF THE PREFERRED EMBODIMENTS

Figure 1:
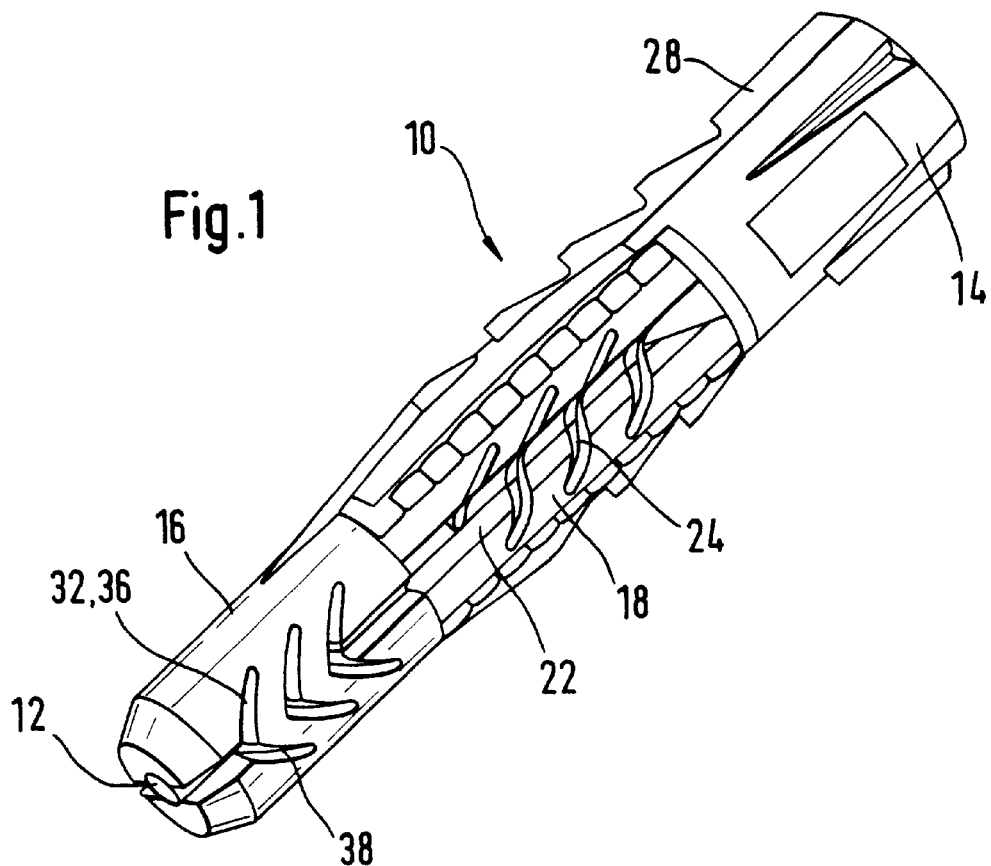
FIG. 1 shows a perspective view of a plug according to the invention.

A plug for fixing two hollow and two solid building materials is shown in the drawings and identified as a whole with reference numeral 10.

Figure 2:
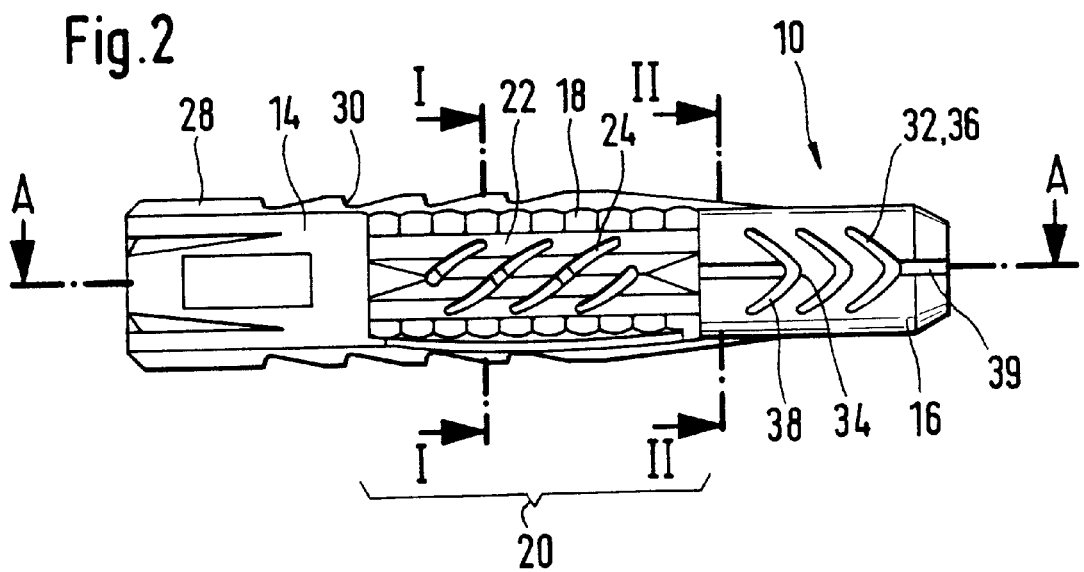
FIG. 2 shows the plug of FIG. 1 according to the invention, in side view.

The plug 10 according to the invention shown in FIGS. 1–3 is manufactured from plastic material, and is approximately in the form of a sleeve. The plug 10 has a screw channel 12 for an expansion screw, not illustrated in FIGS. 1–3. The channel passes axially through the plug 10 and tapers conically at two points.

In the rear region, the plug 10 has a sleeve-form plug end 14 and in the leading region it has a sleeve-form plug tip 16. The plug tip 16 is integrally connected to the plug end 14 by two oppositely arranged, longitudinally running expansible limbs 18. The expansible limbs 18 define an expansion region 20 of the plug 10. This region extends from the plug end 14 to the plug tip 16. Circumferentially, the expansible limbs 18 are joined to one another by a stretchable material 22, which is interrupted by several helically arranged slots 24. The stretchable material 22 consists of the same plastics material as the remainder of the plug 10. The stretchable material 22 is a component integral with the plug 10.

The stretchable material 22 is in the form of a thin web 22, which joins the expansible limbs 18 circumferentially with one another (compare the cross-section I—I of the expansion region 20 in FIG. 4). The thin web 22 has an undulation in the circumferential direction. The thin web 22 is stretchable in the circumferential direction of the plug 10 both by virtue of its undulation and by virtue of its thin construction and the stretchability of the plastics material of which it consists. The helically arranged slots 24 promote the formation of an enlargement by the expansible limbs, illustrated in FIG. 6, when mounting the plug 10 in a panel, but at the same time prevent the thin web 22 from tearing.

Starting from the plug end 14, two opposing anti-rotation ribs 28 running in the lengthwise direction of the plug are arranged on the outer circumference of the plug 10, and extend beyond the expansion region 20 as far as the plug tip 16. The anti-rotation ribs 28 are of saw-tooth construction over a part of their length, the perpendicular front edge 30 facing towards the plug tip 16.

The sleeve-form plug tip 16 is provided with non-rectilinear slots 32, the peak or angle 34 of which is directed forwards. The slots 32 are arranged at two oppositely located places on the plug tip 16 and several (three) slots 32 are arranged spaced axially from one another on the plug tip 16. The non-rectilinear slots 32 have arms 36, 38, one arm 36 being inclined in the direction of a lead of the thread of the expansion screw, not shown in FIGS. 1–3. The other arm 38 is inclined in the opposite direction. The inclination of the arms 36 need not correspond to the lead of the thread of the expansion screw, the inclination runs only in the same direction.

In the region of the plug end 14, the screw channel 12 has approximately a circular cross-section, it narrows in the expansion region 20 (FIG. 4) and in the plug tip 16 is in the form of a slot (FIG. 5). This enables the screw channel 12 to adapt well to expansion screws of different diameter. The two opposing, axially extending slots 39 in the region of the plug tip 16 serve the same purpose, their slot base running spaced from the screw channel 12.

Figure 6:
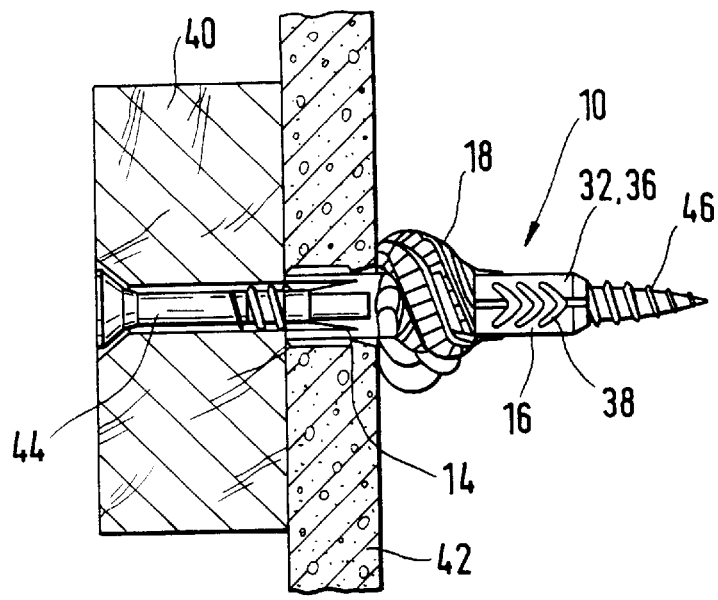
FIGS. 6 and 7 show two examples of application of the plug of the inventive plug, taken of FIG. 1 according to the invention.

The function of the plug 10 according to the invention is explained below with reference to FIGS. 6 and 7: FIG. 6 shows the fixing of an article 40 to a panel-form building material 42. The plug 10 is inserted in a hole drilled in the panel-form building material 42. Because of the relatively large transverse dimension of the plug end 14, the plug end 14 widens the drilled hole and in so doing compacts the building material surrounding the plug end 14. The anti-rotation ribs 28 form abutment surfaces, which prevent the plug from turning with an expansion screw 44 as this is screwed in.

After insertion of the plug 10, the article 40 to be fixed, in which a hole has been drilled, is held against the panel-form building material and the expansion screw 44 is pushed through the article 40 and screwed into the plug 10. A screw thread 46 of the expansion screw 44 cuts into the plug tip 16 and the screw thread 46 engages in the arms 36 of the non-rectilinear slots 32 that are inclined in the same direction as the screw thread 46 of the expansion screw 44. The arms 38 of the non-rectilinear slots 32 that are inclined in the opposite direction enable the plug tip 16 to stretch axially, so that the axial spacing of the slots 32 from one another adapts to a lead of the screw thread 46. In combination with the flat, slot-form screw channel 12 in the plug tip 16, the effect of the non-rectilinear slots 32 is that the plug tip 16 adapts well to a diameter of the particular expansion screw being used and to lead of its screw thread 46.

During screwing in and tightening, the expansion screw 44 draws the plug tip 16 towards the plug end 14, the spacing between the plug tip 16 and the plug end 14 being reduced. During that process, the expansible limbs 18 wind around one another to form a knot-like structure, so that the expansible limbs 18 of the plug 10 engage positively behind the panel-form building material 42, producing a good anchorage of the plug 10 even on a low-stretch panel-form building material 42, such as plasterboard.

Figure 7:
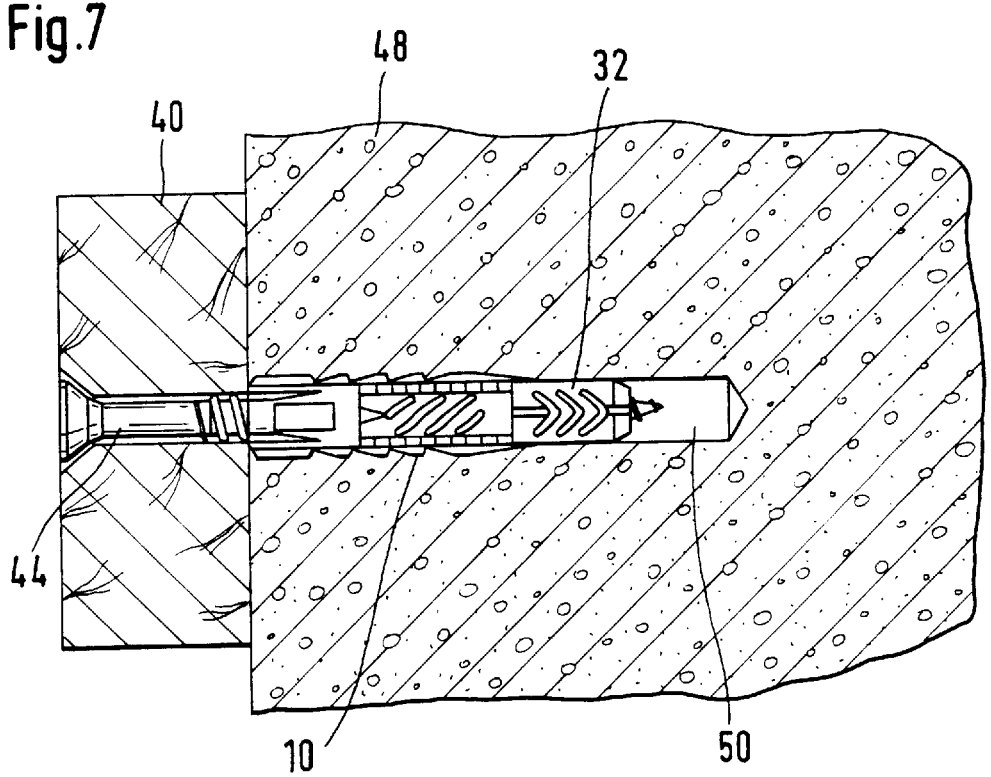

FIG. 7 illustrates the anchoring of an article 40 to a solid building material 48, such as concrete, for example. Here, the expansible plug 10 is inserted in a manner known per se into a hole 50 drilled in the solid building material, the article 40 is offered up and the expansion screw 44 is pushed through the article 40 and screwed into the plug 10. The expansion screw 44 presses the expansible limbs 18 apart and consequently anchors the expansible plug 10 in the drilled hole 50. Pressing the expansible limbs 18 apart, that is, expansion thereof, is not hampered by the thin webs 22 connecting the expansible limbs 18 circumferentially, since these are thin and have an undulation and are therefore stretchable circumferentially. The thin webs 22, which join the expansible limbs 18 in the expansion region 20 to form a kind of sleeve, prevent the expansion screw 44 from being able to emerge laterally from the screw channel 12 between the expansible limbs 18 as it is being screwed in.

It will be understood that each of the elements described above, or two or more together, may also find a useful application in other types of constructions differing from the types described above.

While the invention has been illustrated and described as embodied in a plug for fixing to hollow and to solid building materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plug for fixing to hollow and to solid building materials, comprising a plug body having a plurality of longitudinally extending expansible limbs that are expansible by screwing in of an expansion screw, said expansible limbs having a rear end and a leading end; a sleeve-shaped plug end which joins said expansible limbs with one another at said rear end and is formed so that the expansion screw is insertable through said plug end; a sleeve-shaped plug tip which joins said expansible limbs with one another at said leading end and which is formed so that the expansion screw is screwable into said plug tip; and a stretchable material which joins said expansible limbs with one another circumferentially and which is pierced by several helically arranged slots.

2. A plug as defined in claim 1, wherein said plug end has a larger transverse dimension than in a region of said expansible limbs of said plug body and then said plug tip.

3. A plug as defined in claim 1; and further comprising at least two opposing anti-rotation ribs extending in a longitudinal direction and having a saw-tooth construction over a part of the length of said anti-rotation ribs, said anti-rotation ribs being arranged on an outer circumference of said plug body.

4. A plug as defined in claim 1, wherein said plug tip has non-rectilinear slots formed so that one arm of said slots is inclined in a direction of a lid of a thread of the expansion screw and another arm is inclined in an opposite direction.

5. A plug as defined in claim 1, wherein said plug body has a screw channel provided for the expansion screw and having inside said plug tip a cross-section other than a circular cross-section.

6. A plug as defined in claim 1, wherein said plug body has a screw channel which in a region of said plug tip has a flat cross-section.

7. A plug as defined in claim 6, wherein said screw channel of said plug body is slot-shaped.

8. A plug as defined in claim 7, wherein said screw channel of said plug body is formed by two intersecting slots.

9. A plug as defined in claim 1, wherein said plug tip has two opposing slots running in a longitudinal direction of said plug body and having a base spaced from a screw channel provided in said plug body for the expansion screw.

* * * * *